United States Patent
Thayer

(10) Patent No.: US 8,271,971 B2
(45) Date of Patent: Sep. 18, 2012

(54) SYSTEM AND METHOD FOR AUTOMATED PROGRAM UPDATING IN A REMOTE APPLIANCE

(75) Inventor: Jennifer Joy Thayer, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3125 days.

(21) Appl. No.: 10/304,414

(22) Filed: Nov. 26, 2002

(65) Prior Publication Data

US 2004/0103411 A1    May 27, 2004

(51) Int. Cl.
*G06F 9/445* (2006.01)
(52) U.S. Cl. ........ 717/173; 717/167; 717/170; 717/172; 717/178
(58) Field of Classification Search .................. 717/171, 717/173, 168; 709/221
See application file for complete search history.

(56) References Cited

U.S. PATENT DOCUMENTS

| | | | |
|---|---|---|---|
| 6,009,274 A * | 12/1999 | Fletcher et al. | 717/173 |
| 6,049,671 A * | 4/2000 | Slivka et al. | 717/173 |
| 6,425,125 B1 * | 7/2002 | Fries et al. | 717/168 |
| 6,681,390 B2 * | 1/2004 | Fiske | 717/173 |
| 6,735,434 B2 * | 5/2004 | Criss et al. | 455/418 |
| 6,986,133 B2 * | 1/2006 | O'Brien et al. | 717/173 |
| 2004/0031029 A1 * | 2/2004 | Lee et al. | 717/171 |
| 2004/0060044 A1 * | 3/2004 | Das et al. | 717/171 |
| 2004/0068330 A1 * | 4/2004 | White | 717/171 |

* cited by examiner

*Primary Examiner* — Isaac Tecklu

(57) ABSTRACT

Briefly described, one embodiment is a method comprising communicating with a program update server to determine if a program update is available, communicating a response with the program update server indicating that the program update is available from the program update server, and communicating the program update to the remote appliance at a pre-scheduled update time.

29 Claims, 3 Drawing Sheets

SYSTEM AND METHOD FOR AUTOMATED PROGRAM UPDATING IN A REMOTE APPLIANCE

TECHNICAL FIELD

The present invention is generally related to updating programs and, more particularly, is related to a system and method for automated program updating in a remote appliance.

BACKGROUND

It is desirable to ensure that electronic appliances controlled by processor-executed programs effectively and reliably operate. Effective and reliable appliance operation necessarily requires that the programs controlling the appliance operate in a defect-free manner. However, in many instances, unforeseen operating circumstances and/or programming errors cause program execution problems. In the most severe cases, program execution may be halted such that the appliance becomes inoperable. As a result, such defective programs must be updated or replaced.

Even in the cases where a program is defect-free and is executed in a manner that effectively and reliably operates the appliance as intended, programming enhancements may become available in an updated program version after delivery of the appliance to the customer or user. Such program updates may include added features and/or improved program execution algorithms. Program updates may also include a variety of other types of desirable modifications.

When the appliance is used at a remote location, installing a program update in the remote appliance creates a variety of problems. One problem is that the program update must be transported, communicated or otherwise delivered to the remote appliance, and then installed in the appliance. Delays and transportation costs may be associated with the transportation of the program update to the remote device. Also, the process whereby the program update is installed into the appliance requires time. The above-described time factors may create loss-of-use problems for the customer or user.

Installing a program update into a remote appliance already delivered to the customer or user presents a variety of difficulties and inconveniences. One solution is to have the customer or user return the appliance to the seller or distributor so that the appliance may have the program update installed. However, requiring the customer or user to return the appliance is an inconvenience to the customer or user. Also, the customer or user does not have the use of the appliance until the appliance is returned.

Alternatively, the seller or distributor of the remote appliance may dispatch an employee to install the program update into the appliance-at the remote location. However, this practice is expensive to the appliance seller or distributor. Also, the customer or user is inconvenienced by the presence of the dispatched employee, and will not have the use of the appliance until the appliance programming update is completed.

In some types of-appliances, programming updates may be implemented remotely by including within the device a communication system that is configured to communicate with a program update server. The program update is accessed when the customer or user causes the remote appliance to communicate with the program update server. Accordingly, the program update server provides the program update to the appliance. However, the customer must actively cause the program update to be retrieved and installed into the appliance. Accordingly, the customer may be inconvenienced by the time and effort required to access the program update. Also the customer may not have the use of the appliance until the appliance programming update is completed.

In other remote appliances, programming updates may be automatically implemented remotely by including in the device a communication system that is configured to communicate with a program update server when the appliance is in operation. One example is a program update implemented by an internet service provider when the customer or user logs onto the Internet from their personal computer. Here, operation of the remote appliance is temporarily stalled while the program update server communicates the program update to the remote appliance. Often, the customer or user is not aware that a program update will be effected until after the customer starts operation of the remote appliance. Accordingly, the customer or user may be inconvenienced by the waiting time imposed by the program update server during the communication of the program update. Furthermore, installing the program update into the remote appliance requires additional time. Also, the customer or user does not have the use of the remote appliance until the appliance programming update is completed. If the customer's or user's intended use of the remote appliance is time-critical, the unanticipated delay caused by the unforeseen, automatic program update process becomes very undesirable.

SUMMARY

The present invention provides a system and method for automated program updating in a remote device. Briefly described, one embodiment is a method comprising communicating with a program update server to determine if a program update is available, communicating a response with the program update server indicating that the program update is available from the program update server, and communicating the program update to the remote appliance at a pre-scheduled update time.

Another embodiment comprises a memory storing at least one program, and an appliance processor configured to cause the system to communicate with a program update server to inquire if at least one program update corresponding to the program is available from the program update server, and further configured to cause the system to communicate an available program update from the program update server at a prescheduled update time.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention.

DETAILED DESCRIPTION

Figure 1:
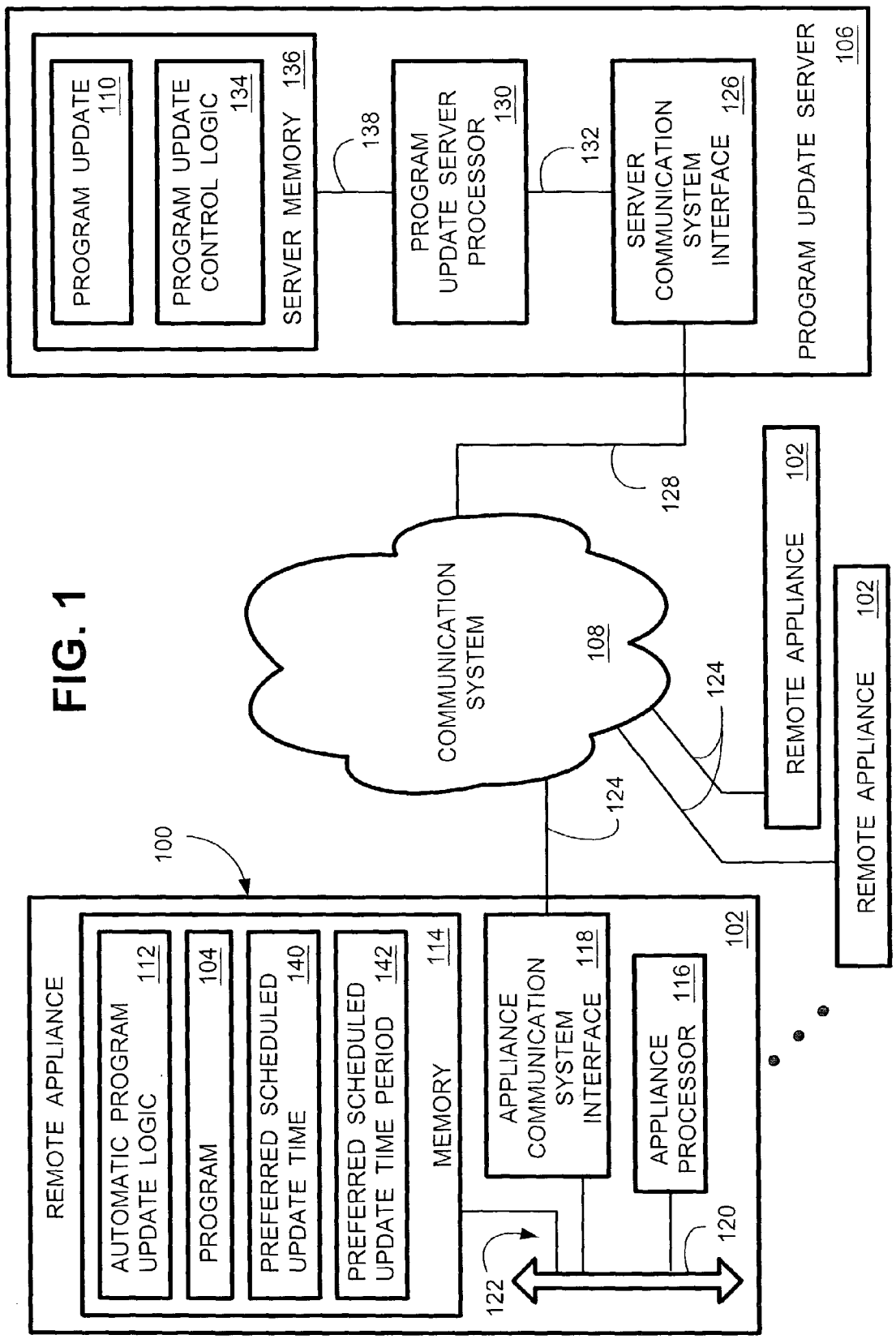
FIG. 1 is a block diagram illustrating one embodiment an automatic program update system implemented in a remote appliance in accordance with the present invention.

FIG. 1 is a block diagram illustrating one embodiment of an automatic program update system implemented in a remote appliance in accordance with the present invention. Such an embodiment is implemented in a remote appliance 102 so that at least one program 104 residing in the remote appliance 102 is automatically updated at a pre-scheduled update time. Preferably, the pre-scheduled update time is selected to be at a time when the remote appliance 102 is not in use by the remote appliance customer or user.

The remote appliance 102, when in use, polls or communicates an inquiry to the program update server 106, via a communication system 108, to determine if a program update 110 is available for a program 104 residing in the remote appliance 102. If the program update 110 is available, a pre-determined pre-scheduled update time determines when the remote appliance 102 communicates with the program update server 106 to receive the program update 110. At the pre-scheduled update time, the program update 110 is communicated from the program update server 106 to the remote appliance 102 such that the program 104 may be updated with the program update 110.

Preferably, the pre-scheduled update time for the communication of the program update 110 is at a time when the remote appliance customer or user is not using the remote appliance 102. During the communication of the program update 110, the remote appliance 102 would be unavailable to the customer or user. Also, the remote appliance 102 would be unavailable to the customer or user when the received program update 110 is installed. Since the communication of the program update 110 is done at a time when the customer or user is not using the remote appliance 102, the customer or user is not inconvenienced by the program update process.

Also, since the program update process is automated, the remote appliance 102 customer or user need not actively effect a program update 110 or be present when the program update 110 is communicated. Nor does the remote appliance 102 customer or user even have to be aware that a program update 110 is being effected by the present invention.

Embodiments of the automatic program update system 100 implemented in the remote appliance 102 comprise the automated program update logic 112 residing in memory 114. The remote appliance 102 also comprises an appliance processor 116 and an appliance communication system interface 118. Remote appliance 102 may be any appliance that is configured to execute programs and is further configured to be communicatively coupled to a communication system 108. Non-limiting examples of remote appliances include televisions (TVs), telephones, handheld devices, personal display assistants (PDAs), entertainment systems, compact disc (CD) players, digital video disc (DVD) players, satellite TV set top boxes, personal computers, workstations, mainframe computers, Global Positioning System (GPS) devices, copy machines, printers, facsimile machines, robotic systems, medical devices, etc. There are no intended limits to the electronic devices that may be configured to operate in accordance with the present invention.

For convenience, memory 114, appliance processor 116 and appliance communication system interface 118 are illustrated as communicatively coupled to each other via communication bus 120 and connections 122, thereby providing connectivity between the above-described components. In alternative embodiments of a remote appliance 102, the above-described components are communicatively coupled in a different manner than illustrated in-FIG. 1. For example, at least one of the above-described components may be directly coupled to each other or may be coupled to each other in another fashion.

Connectivity between the remote appliance 102 and the communication system 108 is provided by the appliance communication system interface 118, via connections 124. The appliance communication system interface 118 is configured to receive and generate signals that are compatible with the communication system 108 to which the remote appliance 102 is coupled.

For example, communication system 108 may be a telephony system such that the appliance communication system interface 118 is configured to couple to a subscriber loop or switch of the telephony communication system. Thus, one embodiment of the appliance communication system interface 118 would comprise a suitable telephone jack for coupling to connection 124 and a suitable signal transceiver, such as a modem. Similarly, communication system 108 may be the Internet, a radio frequency (RF) wireless system, a microwave communication system, a local area network (LAN), a fiber optics system or even a satellite system.

Furthermore, the communication system 108 may be a hybrid system comprised of multiple different types of communication systems. For example, communication system 108 may be a combination of a telephony system and the Internet.

Intermediate components may be employed to provide connectivity to the communication system 108. For example, the communication system interface 118 may be implemented with other suitable media, such as infrared, optical, wireless or the like. Accordingly, the communication system interface 118 is in communication with an intermediary transceiver that is communicatively coupled to communication system 108.

Generally, remote appliance 102 executes program 104 as part of its operation when performing its intended function. For example, if implemented in a TV, the program 104 would be configured to control some operational function of the TV. When the TV is powered, at a convenient time, the automatic program update logic 112 is executed by the appliance processor 116 such that a poll or inquiry is communicated to the program update server 106. A TV typically remains powered at all times, thereby operating in a stand-by mode of operation such that when a viewer desires to view TV programming, the viewer "turns on" the TV to activate the viewing screen and other associated components. Thus, the present invention is configured to communicate at least one program update 110 at a time when the viewer is not likely to be viewing the TV.

In situations where remote appliance 102 cannot successfully establish a connection with the program update server 106 to determine whether a program update 10 is available, one embodiment is configured to periodically attempt to communicate subsequent polls or inquiries. For example, if a dial-up connection process is employed to establish communications between the remote appliance 102 and the program update server 106, lines may be busy or unavailable. The embodiment periodically re-dials the program update server 106 dial-up number. Another embodiment waits until the next time that the remote appliance 102 is operating as described above.

The program update server 106 comprises a server communication system interface 126 configured to communicatively couple the program update server 106 to the communication system 108, via connection 128. The poll or inquiry for the remote appliance 102, is received by the program update server processor 130, via connection 132. Program update control logic 134 is retrieved from server memory 136, via connection 138, and is executed by the program update server processor 130. One embodiment comprises a security system that is used to recognize that the remote appliance 102 initiating the poll or inquiry is authorized to receive a program update 110.

Accordingly, one embodiment of the automatic program update logic 112 is configured to include as part of the communicated poll or inquiry characteristics of the remote appliance 102, such as, but not limited to, a security code, an appliance identification number, a serial number or the like. This feature is used to determine the nature of the remote appliance 102, to identify which program update(s) 110 is applicable to the remote appliance 102, and/or to verify that the remote appliance 102 is entitled and/or authorized to receive the program update 110, if available. This feature is desirable when the program update server 106 is configured to receive polls or inquiries for a plurality of remote appliances, as described below and/or if the general public has access to the program update server 106.

Once a valid poll or inquiry from a remote appliance 102 is received and/or recognized, the program update server 106 determines if a program update 110 is available for at least one program 104 residing in the remote appliance 102. For example, a date associated with program 104 is compared with a date associated with program update 110. If the date of program update 110 is later than the date of program 104, the program update server 106 determines that the remote appliance 102 should receive the program update 110.

In another embodiment, an identification code associated with the program 104 is compared with an identification code of the program update 110. For example, an identification code of "Version 2.04" for program 104 may indicate that the program 104 is the fourth release of program version 2. If the identification code associated with the program update 110 is "Version 2.05", the program update server 106 recognizes that the program update 110 is related to the fifth release of program version 2. Accordingly, the program update server 106 recognizes that program update 110 should be communicated to the remote appliance 102 at a pre-scheduled update time in accordance with the present invention.

The above-described poll or inquiry, in one embodiment, contains information pertaining to the remote appliance 102 and/or program 104 such that the program update server 106 is able to compare program 104 with program update 110. In another embodiment, information pertaining to program 104 is maintained in a database or look-up table by the program update server 106. If information pertaining to the program 104 is maintained by program update server 106, the information is updated when program updates 110 are communicated to the remote appliance 102.

The available program update 110 is communicated to the remote appliance 102 at the pre-scheduled update time. In one embodiment, the pre-scheduled update time is known by the remote appliance 102. At the pre-scheduled update time the remote appliance 102 establishes communication with the program update server 106 such that the program update 110 is communicated to the remote appliance 102. In another embodiment, the pre-scheduled update time is communicated by the program update server 106 as part of the response to the poll or inquiry. Such an embodiment facilitates coordination of communication of program updates if one program update server 308 (FIG. 3), described below, is configured to provide program updates to a plurality of remote appliances 102.

One embodiment is configured to accept from the customer or user a preferred schedule update time 140 that may be scheduled for communication of a program update 110. For example, the preferred time of 11:00 p.m. may be specified such that if a program update 110 is available, the program update server 106 confirms that the program update 110 will be communicated to the remote appliance 102 at 11:00 p.m. Or a suitable preferred schedule update time period 142 may be specified by the customer or user. For example, a time period of 11:00 p.m. to 5:00 a.m. may be specified by the customer or user. In one embodiment, the remote appliance 102 establishes communications with the program update server 106 at the preferred schedule update time 140 or during the preferred schedule update time period 142. In embodiments that communicate the preferred schedule update time 140 or the preferred schedule update time period 142 to the program update server 106, the program update server 106 determines the pre-scheduled update time based upon the received preferred schedule update time 140 or preferred schedule update time period 142. If a program update 110 is available, the program update server 106 selects the pre-scheduled update time and communicates the pre-scheduled update time to the remote appliance 102.

The preferred schedule update time 140 or time period 142 determined by the customer or user in one embodiment is communicated to the program update server 106 as part of the initial poll or inquiry. In another embodiment, the scheduled update time 140 or time period 142 may be communicated from the remote appliance 102 to the program update server 106 during a subsequent communication. Or, the time or time period may be predefined and maintained in a database, look-up table or the like by the program update server 106.

After a poll or inquiry is received from a remote appliance 102, and a determination is made that a program update 110 is available, the program update server 106 then communicates a response signal to the remote appliance 102 indicating that a program update 110 is available and should be communicated to the remote appliance 102 such that program 104 is updated. In one embodiment, a suitable update time for communicating the program update 110, and/or for implementing the update, is communicated to the remote appliance 102. Preferably, this pre-scheduled update time is during a time period that the customer or user is not actively using the remote appliance 102.

Accordingly, at the pre-scheduled update time, the remote appliance 102 and the program update server 106 establish communications such that the program update server 106 communicates the program update 110 to the remote appliance 102 and such that the program 104 is updated. In one embodiment, the remote appliance 102 initiates the communication to the program update server 106. If a communication cannot be established on the first try, one embodiment of the remote appliance 102 is configured to attempt to establish subsequent communications with the program update server 106 on a periodic basis. The periodic basis may be a matter of seconds or minutes, or may even be on subsequent days.

The above-described process wherein the remote appliance 102 polls or inquires whether a program update 110 is available and the communication of the response indicating availability of a program update 110 (and the optional pre-scheduled update time, depending upon the embodiment) is preferably very quickly effected. That is, the customer or user of the remote appliance 102 is not significantly inconvenienced by the time required to effect the above-described portion of the program update process because the poll and associated response is implemented is a very short time period.

The above-described process of communicating a poll or inquiry, determining if a program update 110 is available (and the pre-scheduled update time, in one embodiment), occurs when the remote appliance 102 is initially activated by the customer or user. That is, when the customer or user turns on the remote appliance 102, the above-described process is effected. In another embodiment, the above-described process occurs when the remote appliance 102 is deactivated (turned off) by the customer or user. In other embodiments, the above-described process occurs as a background process, or occurs during pauses in the use of the remote appliance 102.

In one embodiment, the remote appliance 102 employs a predefined inquiry time to cause an automatic communication of a poll or inquiry to the program update server 106. Accordingly, if the remote appliance 102 has been in a "sleep mode" or other operationally-inactive state for a relatively long period of time, the above-described polling or inquiry might not otherwise be made in a timely manner to determine if a program update 110 is available. That is, since the remote appliance 102 has not been in use, the remote appliance 102 has not communicated a poll or inquiry to the program update server 106 to determine if a program update 110 is available. In this embodiment, after the expiration of the predetermined inquiry time, the remote appliance 102 "wakes up" (e.g., returns to active state) from the sleep mode or inactive state, and initiates a communication with the program update server 106 to determine if a program update 110 is available.

This predetermined inquiry time may be a convenient time period such as an hour, a day, a week, a month. For example, the predefined inquiry time period may be defined as seven days. The inquiry time may be a convenient date, day and/or time. For example, the predefined inquiry time period may be defined as every Friday night at 11:00 p.m.

The predetermined inquiry time is determined by the nature and/or purpose of the remote appliance 102. In the situation where the remote appliance 102 is a relatively new product having a program 104 that is not time-tested, and wherein program updates 110 are made available on a relatively frequent basis, the predetermined inquiry time may be relatively short, such as daily or weekly. Or, the purpose, operation and/or functions of the remote appliance 102 may be sufficiently critical such that it is important to effect program updates shortly after they become available. Alternatively, the predetermined inquiry time may be relatively long in situations where the program update 110 is not as critical to the operation and/or functions of the remote appliance 102.

In situations where a plurality of program updates 110 are available for a remote appliance 102 employing a plurality of programs 104, the plurality of program updates 110 are communicated to the remote appliance 102 at the pre-scheduled update time in accordance with the present invention. In one embodiment, a list identifying available program updates 110 is communicated to the remote appliance 102. In another embodiment, the list includes replacement programs that may be used to replace the outdated program. Thus, a very complex remote appliance 102 having many programs can be updated by embodiments of the present invention.

Figure 2:
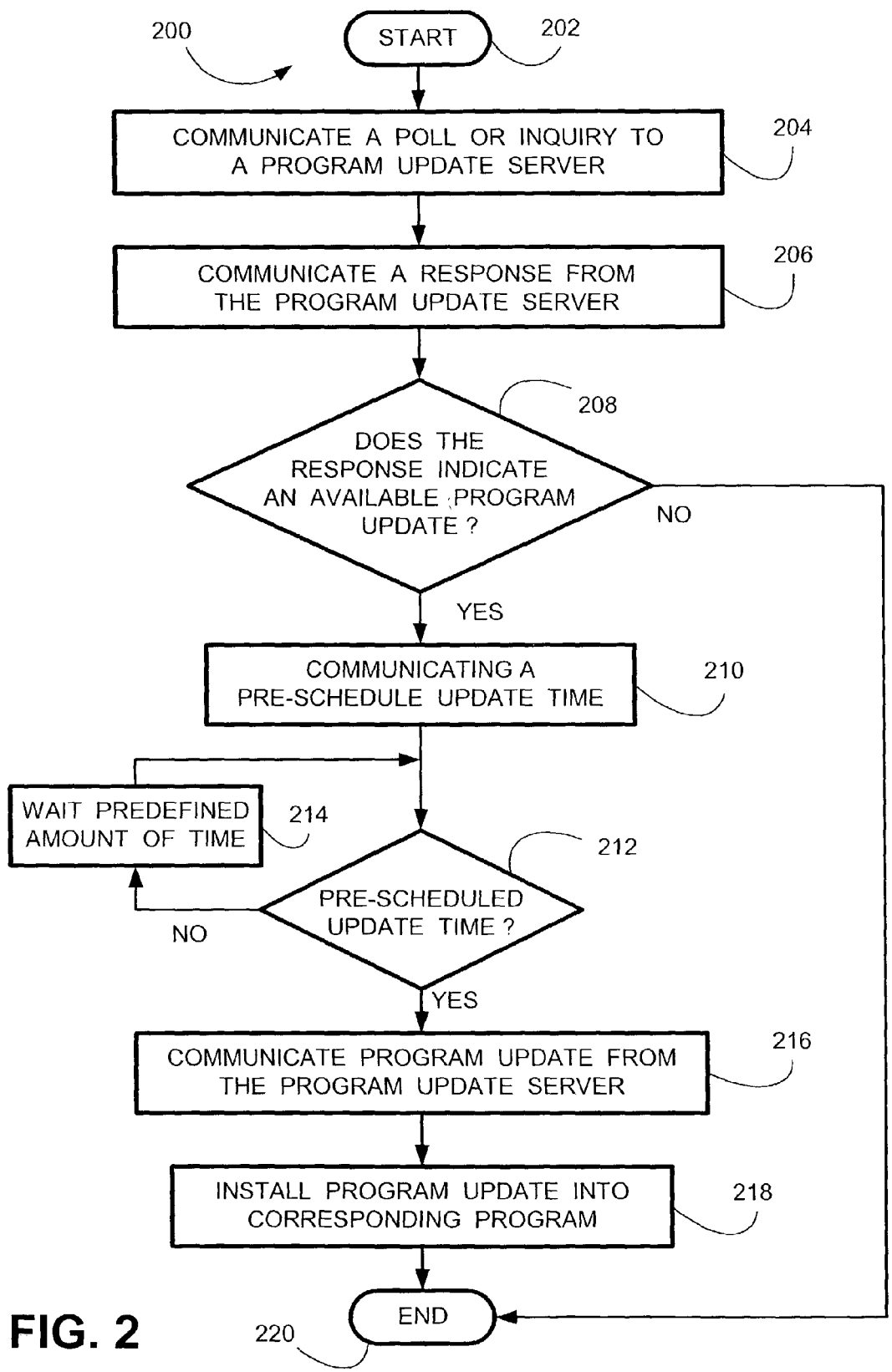
FIG. 2 is a flowchart illustrating an embodiment of a process, according to the present invention, for automated program updating in a remote device.

FIG. 2 is a flowchart illustrating an embodiment of a process, according to the present invention, for automated program updating in a remote device. The flow chart 200 of FIG. 2 shows the architecture, functionality, and operation of an embodiment for implementing the logic 112 (FIG. 1) such that the remote appliance 102, in accordance with the present invention, communicates a poll or inquiry to the program update server 106 so that an available program update 110 is communicated to the remote appliance 102 at a pre-scheduled update time. An alternative embodiment implements the logic of flow chart 200 with hardware configured as a state machine. In this regard, each block may represent a module, segment or portion of code, which comprises at least one executable instructions for implementing the specified logical function(s). It should also be noted that in some alternative implementations, the functions noted in the blocks may occur out of the order noted in FIG. 2, or may include additional functions. For example, two blocks shown in succession in FIG. 2 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of the present invention The process begins at block 202. At block 204 a poll or inquiry is communicated to the program update server 106 by the remote appliance 102. In one embodiment, identification information identifying the remote appliance 102 is included with the communication so that the program update server 106 can determine if the remote appliance 102 is authorized to receive available program updates 110 and/or can determine characteristics of the remote appliance 102. An alternative embodiment includes identifying information with the communication corresponding to the program 104 such that the program update server 106 can determine if a program update 110 is available. Another embodiment includes information identifying a plurality of programs 104 that may each have a corresponding available program update 110. Another embodiment does not include identifying program information in the communication since the information corresponding to programs 104 in the remote appliance 102 are maintained in a database, look-up table or the like by the program update server 106. Other embodiments include more than one of the above-described features.

At block 206 the remote appliance 102 and the program update server 106 communicate a response. In one embodiment, the remote appliance 102 receives the response from the program update server 106. In another embodiment, the remote appliance 102 retrieves the response from the program update server 106.

At block 208 a determination is made whether the response indicates that a program update 110 is available. If not (the NO condition), the process proceeds to block 220 and ends because the response indicates that no program update is available. If a program update 110 is available, the process proceeds to block 210.

In another embodiment, if no response is received, the process proceeds to block 220 and ends because the absence of a return response indicates that communication with the program update server 106 was not established. In such instances, the failure to receive a response to a poll may be caused by a break-down of the communication system. In other instances, the program update server 106 may be too busy or be out-of-service such that a response cannot be provided. One embodiment is configured to repeatedly communicate polls to the program update server 106 until a response is received. Another embodiment is configured to communicate a poll to the program update server 106 at the next occurring polling time.

At block 210 a pre-scheduled update time is communicated. In another embodiment, the response includes a pre-scheduled update time when the program update 110 will be communicated to the remote appliance 102. In another embodiment, if a program update 110 is available, the remote appliance 102 communicates a preferred schedule update time or time period to the program update server 106, described herein, such that a pre-scheduled update time is selected.

At block 212 a determination is made whether the current time corresponds to the pre-scheduled update time. If not (the NO condition), the process proceeds to block 214 such that a predefined amount of time is waited for before returning to block 212. Any suitable amount of wait-time may be defined. For example, one embodiment increments real time in a suitable increment, such as, but not limited to, one minute, so that the loop defined by blocks 212 and 214 is incrementally repeated by minutes until the pre-scheduled update time is reached. In another embodiment, the current time that block 212 is initially executed is compared with the prescheduled update time. The difference determined between the current time and the pre-scheduled update time equals the predefined amount of wait-time for block 214. When the pre-scheduled update time occurs as determined at block 212 (the YES condition), the process proceeds to block 216.

At block 216 the program update 110 is communicated from the program update server 106 to the remote appliance 102. In one embodiment, the remote appliance 102 retrieves the program update 110 from the program update server 106. In another embodiment, the remote appliance 102 receives the program update 110 from the program update server 106.

At block 218, in one embodiment, the received program update 110 is installed into the corresponding program 104 such that program 104 is updated. Other embodiments may replace the program 104 with the received program update 110, recompile the program 104 using the program update 110, or wait until a later time to update the program 104 with the program update 110. The process ends at block 220.

Figure 3:
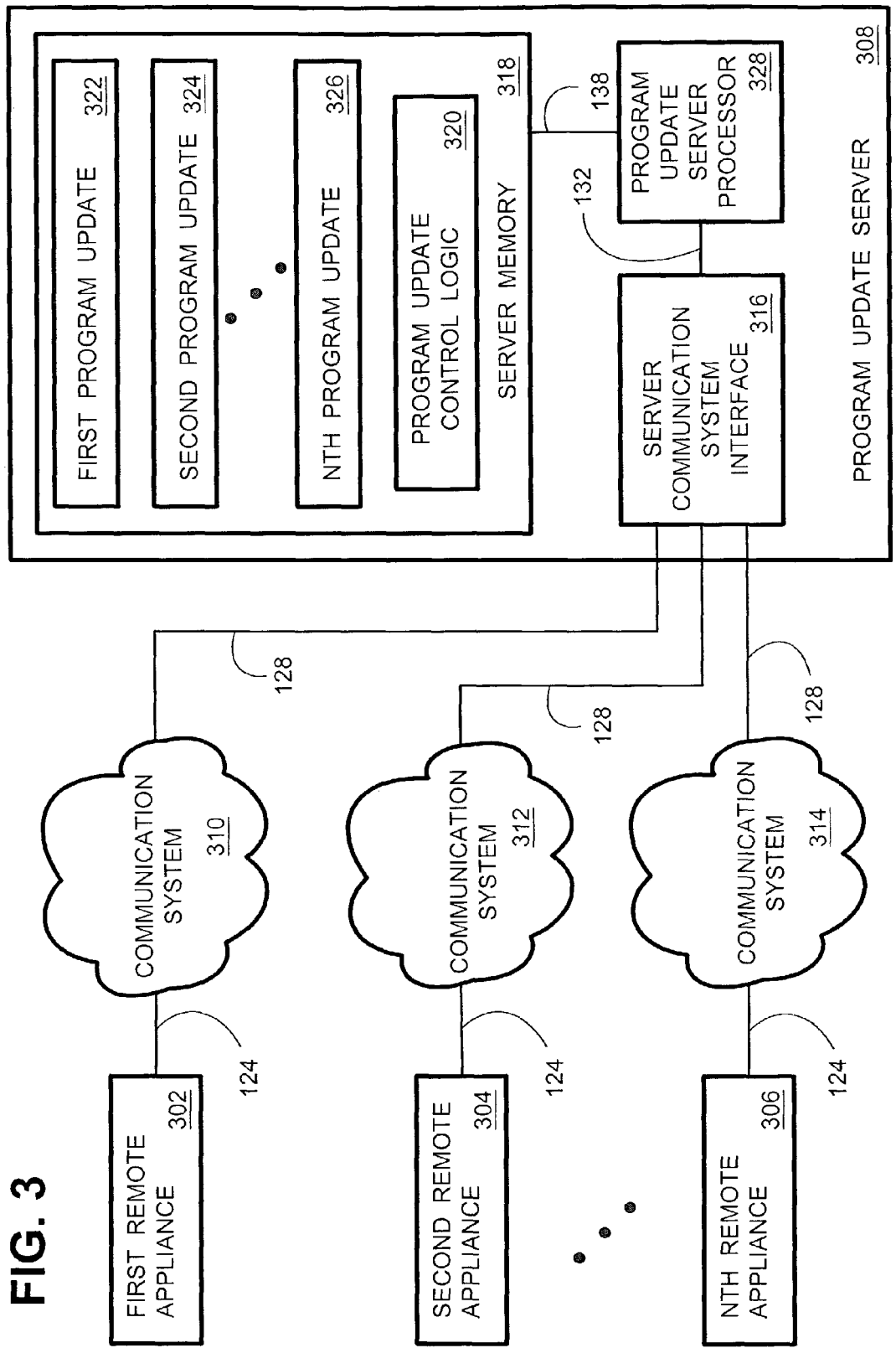
FIG. 3 is a block diagram illustrating an embodiment of an automatic program update system implemented in a plurality of different remote appliances in accordance with the present invention.

FIG. 3 is a block diagram illustrating an embodiment of an automatic program update system implemented in a plurality of different remote appliances in accordance with the present invention. A first remote appliance 302, a second remote appliance 304 and an Nth remote appliance 306 are coupled to the program update server 308, via their respective communication systems 310, 312 and 314. Program update server 308 comprises a server communication system interface 316 configured to communicatively couple to the communication systems 310, 312 and 314, via connections 128. The communication systems 310, 312 and 314 may be comprised of different communication technologies, or may be hybrid combination communication systems. Accordingly, each of the plurality of remote appliances may be configured to communicate to the program update server 308 via any suitable communication system.

The plurality of remote appliances 302, 304 and 306 are comprised of the above-described components of the remote appliance 102 (FIG. 1). Accordingly, the appliance communication system interface 118 residing in each of the remote appliances 302, 304 and 306 may be configured to support communication over its respective communication system 310, 312 and 314. Furthermore, the type, make, model of the remote appliances 302, 304 and 306 may be different. For example, the first remote appliance 302 may be an earlier model of the second remote appliance 304. Or, the remote appliances 302, 304 and 306 may be entirely different types of appliances. For example, the first remote appliance 302 may be a TV and the second remote appliance 304 may be a computer.

The program update server 308 comprises a server memory 318 where the program update control logic 320 and a plurality of program updates 322, 324 and 326 reside. When a valid poll or inquiry is received from one of the remote appliances 302, 304 and 306, the program update server processor 328 executes the program update control logic 320 and determines the nature of the remote appliance generating the poll or inquiry. Then, the need for a program update is determined by comparing the program(s) in the remote appliance with available program updates 322, 324 and 326. If a program update is appropriate for the remote appliance, the program update server 308 communicates the availability of a program update to the remote appliance. An alternative embodiment also specifies a pre-scheduled update time that the program update is to be communicated to and installed in a remote appliance. At the pre-scheduled update time, the program update is communicated to the remote appliance.

For example, the first remote appliance 302 may communicate a poll or inquiry to the program update server 308. The poll or inquiry would include a security code, appliance identification number, serial number or the like of the first remote appliance 302. In one embodiment, the poll or inquiry also includes information pertaining to at least one program residing in the remote appliance 302.

Accordingly, the program update server 308 determines the nature of the first remote appliance 302. Also, the nature of the program(s) residing in the remote appliance 302 is determined based upon information in the received poll or inquiry, or by information maintained by the program update server 308, depending upon the embodiment. In embodiments employing security, the program update server 308 determines if the first remote appliance 302 is authorized to receive program updates. The program update server 308 analyzes information corresponding to at least one program in the first remote appliance 302 to identify any available program updates. For example, the program update server 308 could determine that the first remote appliance 302 should receive the first program update 322. Accordingly, the program update server 308 communicates the availability of program update 322 to the first remote appliance 302 and, depending upon the embodiment, specifies a pre-scheduled update time that the first program update 322 is to be communicated to the first remote appliance 302.

As another example, the second remote appliance 304 may communicate a poll or inquiry to the program update server 308. The program update server 308 could determine that the second remote appliance 304 should receive the second program update 324 and the Nth program update 326. Accordingly, the program update server 308 communicates the availability of a program update to the first remote appliance 302 and, depending upon the embodiment, specifies a pre-scheduled update time that, for the present example, the second program update 324 and the Nth program update 326 are to be communicated to the second remote appliance 304.

It is appreciated that any number of remote appliances 302, 304 or 306, or different types of remote appliances 302, 304 or 306, can communicate a poll or inquiry to the program update server 308 to determine if a program update is available for the remote appliance. The program update server 308 is configured to determine the nature of the remote appliance and determine which program updates are available for that remote appliance. Furthermore, it is appreciated that any number or types of different communication systems can be used to support communications between a remote appliance and the program update server 308.

The program update 110 (FIG. 1) or 308 (FIG. 3) as described herein may be an entire update program that when received by a remote appliance 102 in accordance with the present invention, replaces the outdated program residing in the remote appliance 102 with an update program. Thus, the entire received update program replaces the outdated program. Also, a replacement program, different from the outdated program, may be communicated to a remote appliance 102 such that the outdated program is replaced by the replacement program. Or, the program update 110 as described herein may be a portion of the outdated program residing in the remote appliance 102. Such program update portions may be referred to a module, a kernel or the like.

Once the program update 110 is received by a remote appliance 102, the program update 110 is effected or otherwise installed in the remote appliance 102 using any suitable update technique now known or later developed. For example, the program update 110 may require program recompiling as part of the update process in accordance with the present invention. It is appreciated that any type of program update 110 may be communicated. Furthermore, any suitable update process may be employed.

One embodiment allows the program update server 106 to specify the prescheduled update time to the remote appliance 102. This embodiment may be employed in situations where the program update server 106 is scheduling program updates 110 to many different remote appliances 102.

Embodiments of the invention implemented in memory 114 and/or server memory 136 (FIG. 1) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

For convenience, program 104 and automatic program update logic 112 are illustrated as residing in memory 114. In other embodiments, program 104 and automatic program update logic 112 reside in different memories and/or different computer-readable medium. For example, but not limited to, in one embodiment, program 104 resides in a memory directly coupled to appliance processor 116 that is used for program execution, and program update logic 112 resides in a general purpose memory that is accessed by appliance processor 116. In an embodiment having a plurality of programs 104, the plurality of programs 104 may reside in different memories and be updated by corresponding program updates 110 in accordance with the present invention.

Therefore, having thus described the invention, at least the following is claimed:

1. A method for automated program updating in a remote appliance, the method comprising:
   communicating by the remote appliance with a program update server at a time the remote appliance is deactivated to determine if a program update is available;
   communicating a response with the program update server indicating that the program update is available from the program update server;
   selecting a pre-scheduled update time by the remote appliance;
   communicating the pre-scheduled update time from the remote appliance to the program update server; and
   communicating the program update to the remote appliance at the pre-scheduled update time.

2. The method of claim 1, wherein communicating the response further comprises receiving the response from the program update server.

3. The method of claim 1, wherein communicating the response further comprises retrieving the response from the program update server.

4. The method of claim 1, wherein communicating the program update further comprises receiving the program update from the program update server.

5. The method of claim 1, wherein communicating the program update further comprises retrieving the program update from the program update server.

6. The method of claim 1, wherein communicating the program update further comprises communicating a program portion.

7. The method of claim 1, wherein communicating the program update further comprises communicating a replacement program.

8. The method of claim 1, wherein communicating the program update further comprises communicating an update program.

9. The method of claim 1, further comprising installing the received program update, wherein a program residing in the remote appliance is updated.

10. The method of claim 1, further comprising installing at a later time the received program update, wherein a program residing in the remote appliance is updated at the later time.

11. The method of claim 1, wherein communicating with the program update server further comprises communicating at a time the remote appliance is initially activated.

12. The method of claim 1, wherein communicating with the program update server further comprises communicating as a background process.

13. The method of claim 1, wherein communicating with the program update server further comprises communicating during a pause in use of the remote appliance.

14. The method of claim 1, further comprising initiating communication to the program update server at a predetermined inquiry time to determine if the program update is available when communicating to the program update server has not been performed by the end of the predetermined inquiry time.

15. The method of claim 1, wherein communicating further comprises communicating information identifying at least one program residing in the remote appliance.

16. The method of claim 1, further comprising receiving from the program update server a list identifying a plurality of program updates corresponding to the plurality of programs that are to be updated at the pre-scheduled update time.

17. The method of claim 1, wherein communicating with the program update server further comprises communicating information identifying the remote appliance wherein the program update server can determine that the remote appliance is authorized to receive the program update.

18. The method of claim 1, wherein communicating with the program update server further comprises communicating information identifying characteristics of the remote appliance wherein the program update server can determine the nature of the remote appliance to determine which of at least one program update is to be communicated to the remote appliance at the pre-scheduled update time.

19. The method of claim 1, wherein communicating with the program update server further comprises communicating information identifying the remote appliance wherein the program update server determines that the remote appliance is authorized to receive an available program update.

20. A system that automatically updates programs in a remote appliance, comprising:
   a memory storing at least one program; and
   an appliance processor configured to cause the system to communicate by the remote appliance with a program update server at a time the remote appliance is deactivated to inquire if at least one program update corresponding to the program is available from the program update server, configured to select a preferred update time, communicate the preferred update time to the program update server, and further configured to cause the system to communicate an available program update from the program update server at the preferred update time.

21. The system of claim 20, wherein the appliance processor is further configured to receive the program update from the program update server.

22. The system of claim 20, wherein the appliance processor is further configured to retrieve the program update from the program update server.

23. The system of claim 20, further comprising an appliance communication interface configured to communicate to a communication system.

24. The system of claim 23, wherein the appliance communication interface is configured to communicate with at least one selected from a group consisting of a telephony system, an Internet system, an infrared system, a radio frequency (RF) wireless system, a microwave communication system, a local area network (LAN), a fiber optics system and a satellite system.

25. The system of claim 20, wherein the remote appliance comprises at least one selected from a group consisting of a television, a telephone, a handheld device, an entertainment system, a compact disc player, a personal display assistant, a digital video disc player, a satellite TV set top box, a personal computer, a workstation, a mainframe computer, a Global Positioning System device, a copy machine, a printer, a facsimile machine, a robotic system and a medical device.

26. A system for automated program updating in a remote appliance, comprising:
   a remote appliance communicating with a program update server at a time the remote appliance is deactivated to determine if a program update is available;
   means for selecting by the remote appliance a pre-scheduled time to receive the program update;
   means for communicating the pre-scheduled time from the remote appliance to the program update server;
   means for communicating an available program update to the remote appliance from the program update server at the pre-scheduled update time; and
   means for updating a program with the received program update.

27. The system of claim 26, further comprising means for receiving a response from the program update server indicating that the remote appliance is to receive the available program update from the program update server.

28. The system of claim 26, further comprising means for initiating communication to the program update server at a predetermined inquiry time to determine if the program update is available when communicating to the program update server has not been performed by the end of the predetermined inquiry time.

29. A tangible computer-readable medium having a program for automated program updating in a remote appliance, the program comprising logic configured to perform:
   communicating by the remote appliance an inquiry signal to a program update server at a time the remote appliance is deactivated to determine if a program update is available for at least one program residing in the remote appliance;
   selecting a preferred update time by the remote appliance;
   communicating a response from the remote appliance to the program update server the response having at least the preferred update time that the remote appliance is to receive the program update from the program update server;
   communicating the program update from the program update server at the preferred update time; and
   updating the program with the received program update.

* * * * *